(No Model.)  2 Sheets—Sheet 1.

J. R. BEVIL.
ANIMAL TREAD.

No. 454,200. Patented June 16, 1891.

WITNESSES:
A. E. Glascock,
M. E. Lansdale.

INVENTOR
J. R. Bevil
BY
John S. Duffie
ATTORNEY.

(No Model.) 2 Sheets—Sheet 2.

J. R. BEVIL.
ANIMAL TREAD.

No. 454,200. Patented June 16, 1891.

WITNESSES:
A. E. Glascock,
M. E. Lansdale.

INVENTOR
J. R. Bevil
BY John S. Duffee
ATTORNEY.

UNITED STATES PATENT OFFICE.

JOHN R. BEVIL, OF VILLAGE MILLS, TEXAS.

ANIMAL-TREAD.

SPECIFICATION forming part of Letters Patent No. 454,200, dated June 16, 1891.

Application filed October 29, 1890. Serial No. 369,661. (No model.)

*To all whom it may concern:*

Be it known that I, JOHN R. BEVIL, a citizen of the United States, residing at Village Mills, in the county of Hardin and State of Texas, have invented certain new and useful Improvements in Animal-Treads; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to animal-treads; and it consists in the novel construction and arrangement of its parts.

Figures 1, 2:
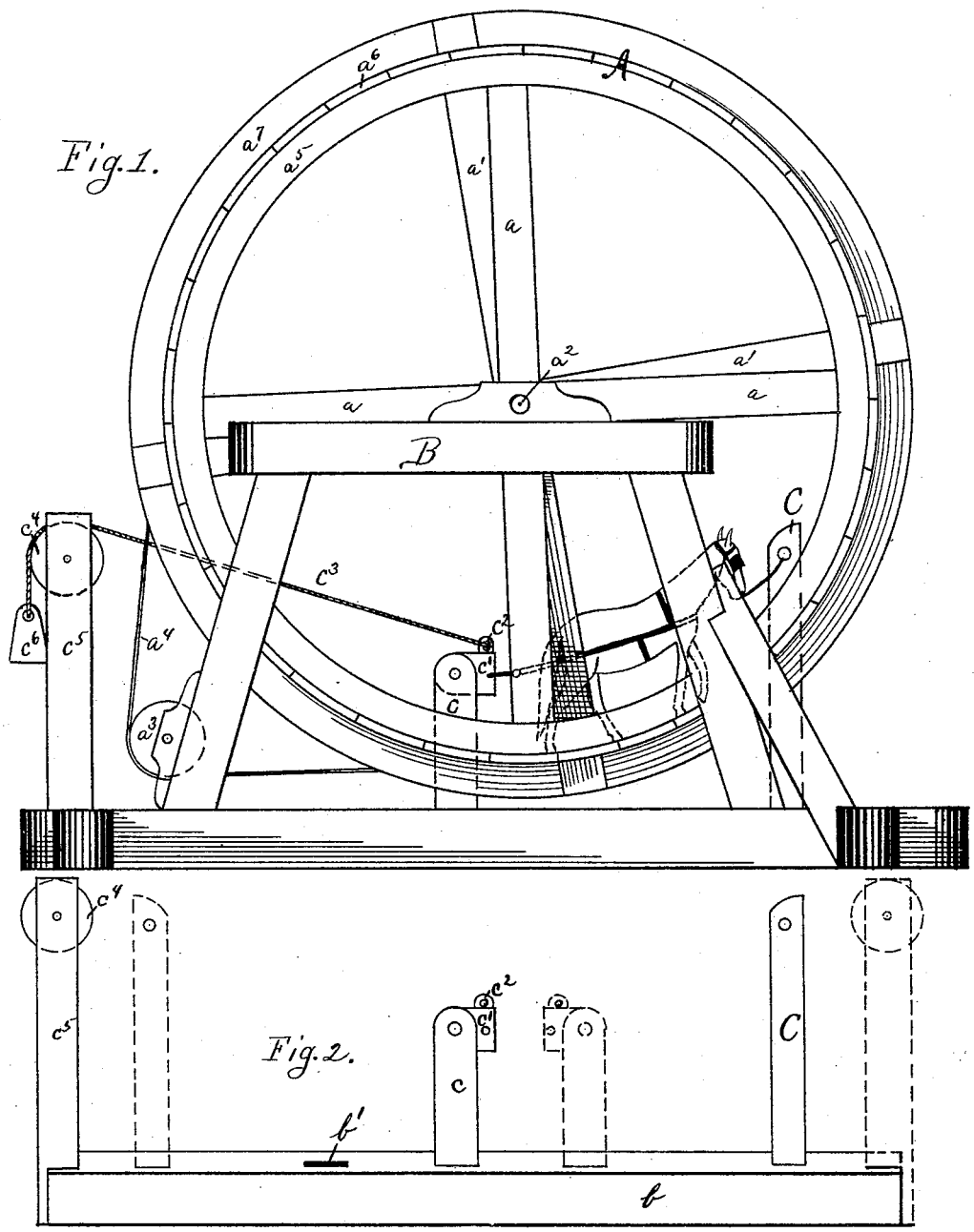
Figure 3:
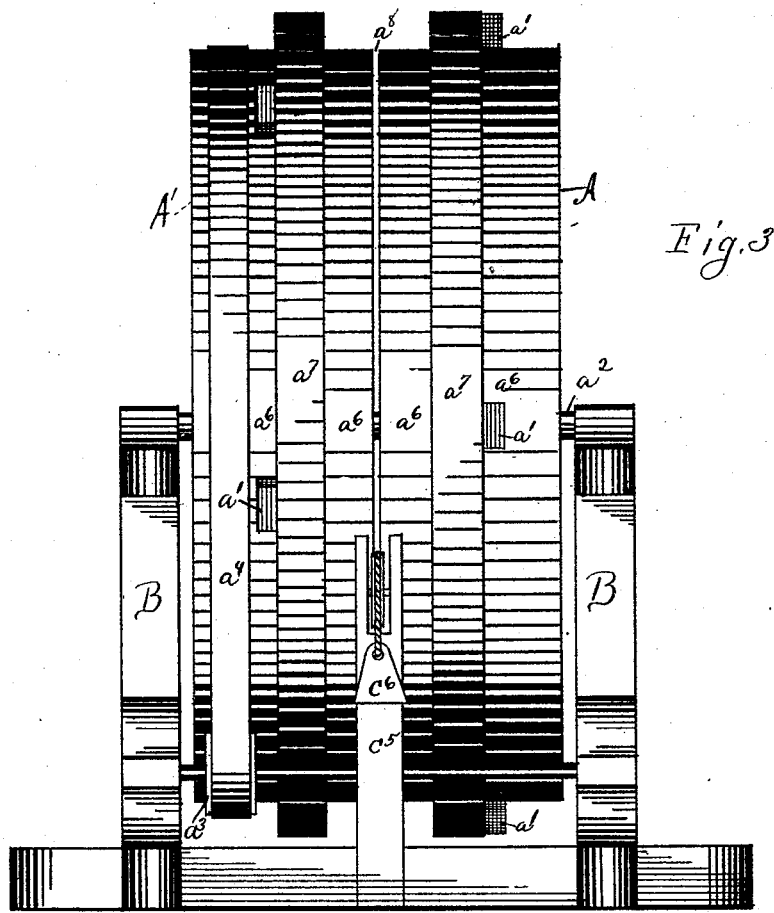
Figure 4:
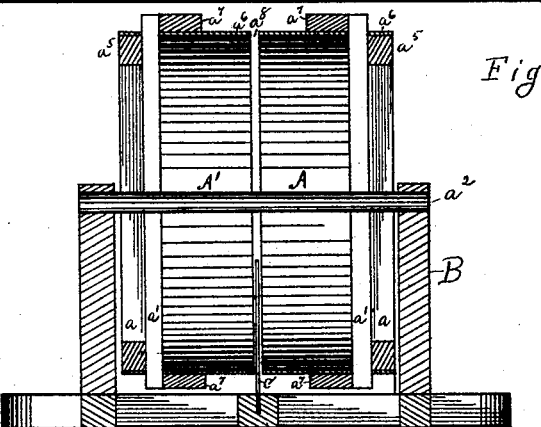

In the accompanying drawings, Figure 1 is a side elevation of my invention, showing a horse operating the tread. Fig. 2 is a detail view. Fig. 3 is an end view. Fig. 4 is a vertical sectional view.

My invention is described as follows: It consists of two large wheels A and A', having the spokes $a$ and $a'$. Said wheels are journaled on an axle $a^2$ and have a space $a^3$ between them. Said wheels and axle work in a suitable frame B, as shown, with a center beam $b$, (see Fig. 2,) provided with a number of sockets $b'$, so that the position of the uprights C and $c$ may be changed at will. Upright C is perforated at its upper end, so that an animal may be hitched to it, and upright $c$ has an arm $c'$ pivoted to its upper end. Said arm has a perforated lug $c^2$, to which is fastened one end of a rope $c^3$, the other end of which passes over a pulley $c^4$, journaled in an upright $c^5$, and is attached to a weight $c^6$. The lower ends of the uprights C, $c$, and $c^5$ are set in the mortises $b'$ of the longitudinal beam $b$, and the uprights C and $c$ pass up through the space $a^8$ between the wheels A and A', and the rope $c^3$ also passes through said space. Around the periphery of wheel A' and around pulley $a^3$ works an endless belt $a^4$.

Wheels A and A' are constructed as follows: The spokes $a$ are mortised in the felly $a^5$, which runs around under the outer end of the planks that compose the floor $a^6$, and around the periphery of said felly is attached the floor $a^6$, and around the periphery of the floor and near its inner edge is secured tire $a^7$, which in turn is secured to the spokes $a'$, which pass through the floor $a^6$. This tire and said spokes $a'$ support the weight of the horse. The companion wheel is made exactly similar to the one just described.

My invention is operated as follows: The animals or animal is placed in the tread, as shown, the single or double tree being attached to the arm $c'$, and thus in addition to his weight he will have his strength to operate the tread. The function of the rope $c^3$ and weight $c^6$ is to keep the traces and tree from under the animal's feet in case he should slack his speed, and thus prevent his tripping.

Having described my invention, what I claim as new, and desire to secure by Letters Patent, is—

1. In combination with a frame, substantially as shown and described, a tread consisting of the wheels A and A', upright $c$, having the pivoted arm $c'$, weight $c^6$, and rope $c^3$, and pulley $c^4$, journaled in a suitable bearing, substantially as shown and described, and for the purposes set forth.

2. In combination with a frame, substantially as shown and described, a tread consisting of the wheels A and A', upright C, upright $c$, having the pivoted arm $c'$, weight $c^6$, and rope $c^3$, pulley $c^4$, journaled in a suitable bearing, band $a^4$, and pulley $a^3$, substantially as shown and described, and for the purposes set forth.

3. In combination with a frame, substantially as shown and described, a tread consisting of the wheels A and A', having the spokes $a$ and $a'$, axle $a^2$, fellies $a^5$, floors $a^6$, and tires $a^7$, upright C, upright $c$, having the arm $c'$ pivoted to its upper end, weight $c^6$, and rope $c^3$, working over pulley $c^4$, one end attached to said weight and the other secured to arm $c'$, pulley $c^4$, journaled in upright $c^5$, band $c^4$, working around one of the wheels A or A', and pulley $a^3$, all substantially as shown and described, and for the purposes set forth.

4. In combination with a frame, substantially as shown and described, the wheels A and A', mounted on axle $a^2$ and having the space $a^8$ between them, the spokes $a$ and $a'$, felly $a^5$, floor $a^6$ around the periphery of felly $a^5$, and tire $a^7$ around the periphery of floor $a^6$ and secured to the spokes $a'$, substantially as shown and described, and for the purposes set forth.

5. In combination with a tread, substantially as shown and described, upright $c$, having the pivoted arm $c'$, weight $c^6$, and rope $c^3$, working over pulley $c^4$, journaled in a proper bearing, one end of said rope attached to said weight and the other to arm $c'$, substantially as shown and described, and for the purposes set forth.

6. The combination of the frame B, having the beam $b$, provided with sockets $b'$, and tread-wheels A and A', constructed and mounted on axle $a^2$, as described, and having the space $a^3$ between them, through which the uprights C and $c$ may pass, substantially as shown and described, and for the purposes set forth.

In testimony whereof I affix my signature in presence of witnesses.

JOHN R. BEVIL.

Witnesses:
J. K. P. MILLER,
J. J. DOLLARD.